Sept. 29, 1925.

W. C. STOCKLIN 1,555,036

INCLOSURE FOR LIQUID COOLING PIPES

Filed Oct. 25, 1924     2 Sheets-Sheet 1

INVENTOR.
WILLIAM C. STOCKLIN
BY
Shigley + Harney
ATTORNEYS

Sept. 29, 1925.
W. C. STOCKLIN
1,555,036
INCLOSURE FOR LIQUID COOLING PIPES
Filed Oct. 25, 1924
2 Sheets-Sheet 2
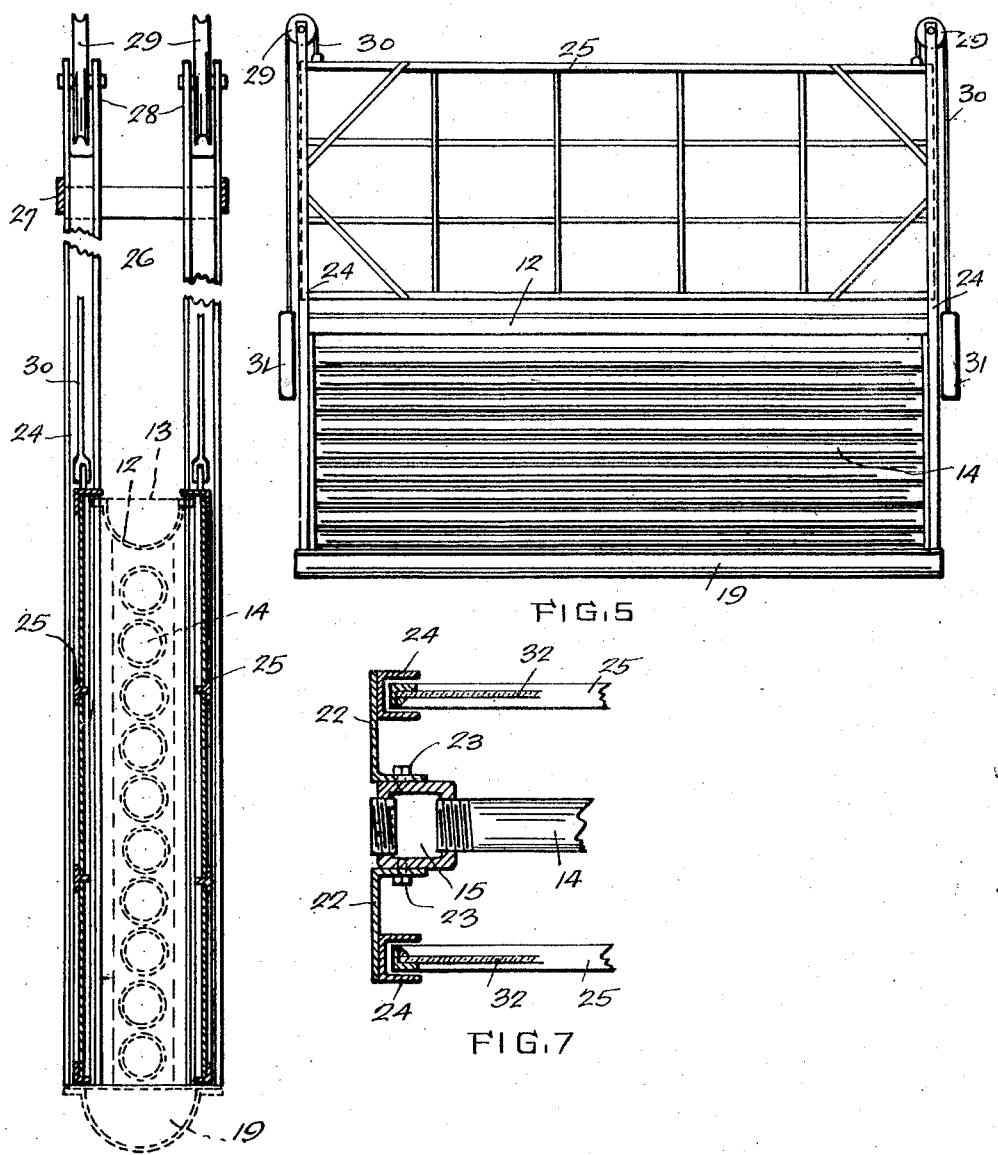
INVENTOR.
WILLIAM C. STOCKLIN
BY
*Shigley & Harney*
ATTORNEYS Patented Sept. 29, 1925.

1,555,036

UNITED STATES PATENT OFFICE.

WILLIAM C. STOCKLIN, OF COLUMBUS, OHIO, ASSIGNOR TO MENZIE DAIRY CO., OF McKEESPORT, PENNSYLVANIA.

INCLOSURE FOR LIQUID-COOLING PIPES.

Application filed October 25, 1924. Serial No. 745,840.

*To all whom it may concern:*

Be it known that I, WILLIAM C. STOCKLIN, a citizen of the United States of America, residing at Columbus, in the county of Franklin and State of Ohio, have invented certain new and useful Improvements in Inclosures for Liquid-Cooling Pipes, of which the following is a specification.

My present invention relates generally to milk cooling apparatus, and more particularly to milk coolers of that type commonly employed between Pasteurizing tanks and apparatus in which the milk is bottled, it being necessary to gradually cool the milk upon its passage from the tanks where it is highly heated in order that it may be safely fed into the bottles without danger of breakage of the latter.

As now practiced, the milk is fed downwardly from elevated Pasteurizing tanks to bottling machines placed upon a lower level, and passes over cooling pipes in which it is gradually cooled, these pipes being at the present time entirely exposed. It is the object of my invention therefore to provide an inclosure for the pipes adapted to permit the pipes to be readily exposed for thorough cleansing such as is necessary at frequent intervals and it is a further object of my invention to provide a covering or inclosure which will involve minimum expense and trouble in its installation without forcing any disturbance of the parts in the usual apparatus as now employed.

Generally speaking my invention proposes an inclosure for milk cooling devices of that type wherein the coils, consisting of horizontal pipes in parallel relation in a vertical series are extended between headers, the inclosure consisting of end members attached to and outstanding from the said headers and which constitute the ends of the inclosure, together with side frames, each preferably of a transparent type, slidable vertically in guides carried by said end members, the said side frames, in their lowermost position, cooperating with the end plates so as to form the complete inclosure and being preferably in connection with counterbalancing weights whereby they may be easily shifted upwardly beyond the end plates in vertical extensions of the guides in order to expose the pipes for the frequent cleanings it is necessary to give them.

Figure 1:
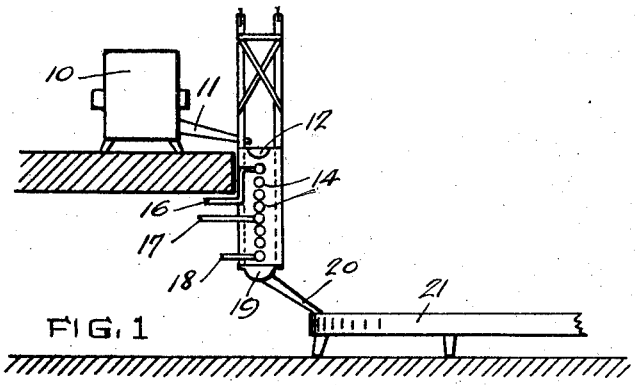
Figures 2, 3:
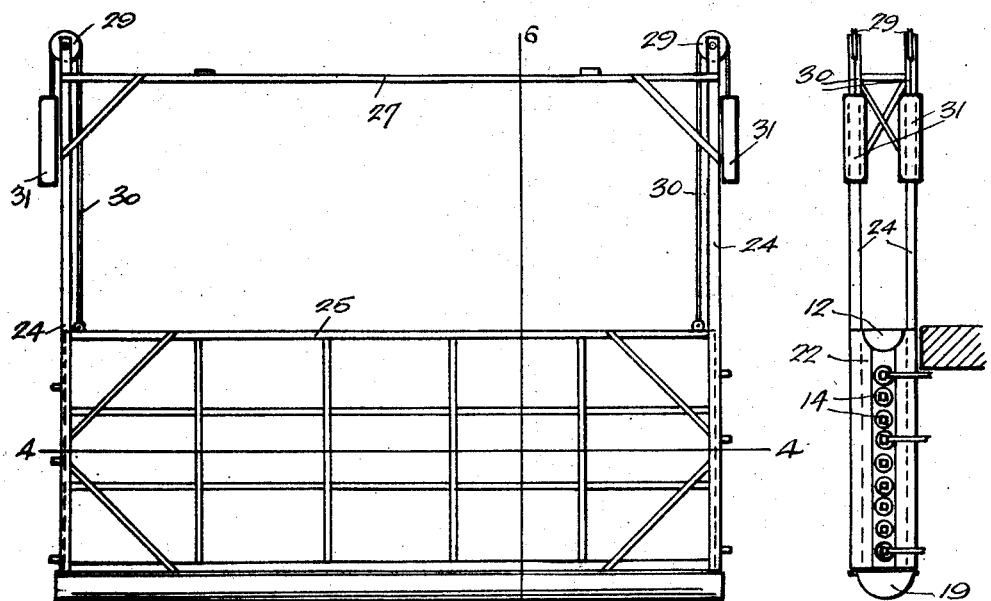
Figure 4:
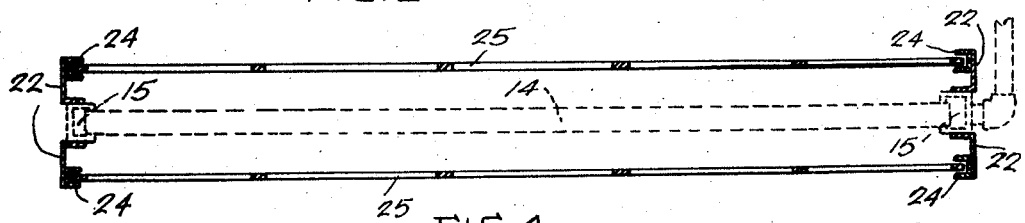

In the accompanying drawings which illustrate my present invention and form a part of this specification, Figure 1 is a side view more or less diagrammatic, illustrating the type of apparatus in connection with which the inclosure proposed by my invention is used, Figure 2 is a side view of my improved inclosure, the side frames being in the lower position, Figure 3 is an end view thereof, Figure 4 is a horizontal section taken therethrough substantially on line 4—4 of Figure 2, Figure 5 is a side view with the side frames elevated to expose the pipes, Figure 6 is an enlarged vertical transverse section taken substantially on line 6—6 of Figure 2, and Figure 7 is a horizontal section, on a substantially enlarged scale, through one end of the apparatus including my invention.

Referring now to these figures my invention has to do with that type of apparatus wherein milk is Pasteurized in elevated tanks such for instance as indicated at 10 in Figure 1, the hot Pasteurized milk outletting from such tank to a lowermost discharge spout and the like 11 whose outer end opens into an upper trough 12. This trough has a line of perforations down its side and is ordinarily covered by a cheese cloth or other fabric cover 13 constituting a fly and dirt screen, and the trough is arranged above the uppermost horizontal pipe of a vertical series of such pipes 14 in the superposed parallel relation shown, the several pipes being extended between and connected at their ends to vertical end headers 15 as best shown in dotted lines in Figure 2 and one of which is plainly seen in Figure 7. These pipes are connected by virtue of the end headers, the latter being hollow, in several series into which cooling material is separately supplied through inlet pipes as for instance the pipes 16, 17 and 18 of Figure 1. The desire is of course to gradually cool the milk dripping through the perforate base of the upper trough 12 onto the series of cooling pipes 14 and it is contemplated that in practice pipe 16 will supply cold water to the upper set of cooling pipes, pipe 17 will supply brine to the next set and pipe 18 will supply ammonia or a similar cooling fluid to the lower set, the milk running down over the sets of pipes and finally dropping from the lowermost pipe into a lower receiving trough 19 from which it discharges through a spout and the like 20 to a bottling machine indicated generally at 21 in Figure 1 and which for convenience is usually mounted upon the ground or a supporting surface substantially below the Pasteurizing tanks 10.

The above structure as generally utilized finds the cooling pipes 14 entirely exposed so that the milk as it runs down over these pipes and as it is cooled, is in the nature of contamination from the air and my invention therefore proposes an inclosure or covering structure including upright end plates 22 of L-shape, whose inner shorter sides are bolted or otherwise attached as at 23 to the sides of the end headers 15, so that the plates project upwardly along opposite sides of these headers for the full length of the latter and extend laterally therefrom for the reception upon the inner faces of their longer portions of inwardly opening channeled guide strips 24 wherein the side edges of side cover frames 25 are movably disposed. These channeled guide strips 24 extend substantially above the upper ends of the end plates 22 whereby the side cover frames 25 may be shifted upwardly beyond the series of cooling pipes 14 and the latter fully exposed for the frequent cleaning operations which are necessary in this type of apparatus.

These upwardly extending portions of the guide strips 24 are preferably connected by transverse and longitudinal rails 26 and 27, the upper slotted extremities of the guide strips as at 28, supporting pulleys 29 over which flexible conections 30 are extended. These connections are joined at one end with the upper portions of the opposite ends of the side cover frames 25 and have at their outer opposite ends counterbalancing weights 31 whereby to counterbalance the side cover frames in their upper inactive positions exposing the cooling pipes for cleansing as seen in Figure 5.

In practice the side cover frames 25 are preferably constructed of skeleton form with glass or other transparent sections 32. In this way view of the cooling pipes and of the milk running down over these pipes in operation is provided for in those factories where it is common to have frequent visitors inspecting the apparatus in operation.

It is obvious that the side frames 25 in their lowermost positions constitute the side members of the inclosure contemplated by my invention, the end members of which are formed by the end plates 22 along with the end headers 15 and it is likewise obvious that while the complete effective inclosure is thus constituted, my invention still permits of the necessary frequent cleaning of the cooling pipes in a ready easy manner by simply pushing the side frames 25 upwardly as indicated in Figure 5 so that every portion of the cooling pipes may be reached in the cleansing operation.

I claim:

1. A covering structure for milk cooling pipes extending horizontally and in a vertical series between vertical headers, said structure including end plates secured to and outstanding from the headers, vertical guides caried by the said end plates, and side covering frames supported in said guides, the said guides extending above the end plates whereby the side frames may be shifted vertically to expose the cooling pipes for cleaning.

2. A covering structure for milk cooling devices of the type including pipes extending between headers, said structure including vertical guides upstanding beyond opposite sides and adjacent to the ends of the cooling device and connected thereto and to one another, and side covering frames at opposite sides of the cooling device disposed in said guides and shiftable therein above the device whereby to expose the pipes for cleaning.

In testimony whereof I have affixed my signature.

WILLIAM C. STOCKLIN.